United States Patent
Takahashi (10) Patent No.: US 7,353,249 B2
(45) Date of Patent: Apr. 1, 2008

(54) METHOD AND APPARATUS FOR DATA RETRIEVAL FROM DATA SERVER USING A SOCKET COMMUNICATIONS PROGRAM

(75) Inventor: Kazutoshi Takahashi, Tokyo (JP)

(73) Assignee: Ricoh Company, Ltd. (JP)

( * ) Notice: Subject to any disclaimer, the term of this patent is extended or adjusted under 35 U.S.C. 154(b) by 913 days.

(21) Appl. No.: 10/260,301

(22) Filed: Oct. 1, 2002

(65) Prior Publication Data

US 2003/0078967 A1 Apr. 24, 2003

(30) Foreign Application Priority Data

Oct. 2, 2001 (JP) .............................. 2001-306512

(51) Int. Cl.
*G06F 15/16* (2006.01)
(52) U.S. Cl. ...................... 709/203; 709/245; 709/227; 345/157
(58) Field of Classification Search ........ 709/223–236, 709/217–219, 245, 200, 202, 203; 715/526; 705/40–44; 345/780–781, 157, 330; 703/15, 703/22; 717/106, 171; 370/389, 401
See application file for complete search history.

(56) References Cited

U.S. PATENT DOCUMENTS

| | | | |
|---|---|---|---|
| 6,397,259 B1 * | 5/2002 | Lincke et al. ............... | 709/236 |
| 6,604,135 B1 * | 8/2003 | Rogers et al. ............... | 709/217 |
| 6,615,258 B1 * | 9/2003 | Barry et al. ................. | 709/223 |
| 6,631,402 B1 * | 10/2003 | Devine et al. .............. | 709/217 |
| 6,701,363 B1 * | 3/2004 | Chiu et al. ................... | 709/224 |
| 6,763,395 B1 * | 7/2004 | Austin ........................ | 709/245 |
| 6,816,880 B1 * | 11/2004 | Strandberg et al. ......... | 709/202 |
| 6,826,610 B1 * | 11/2004 | Sakakura .................... | 709/226 |
| 6,880,126 B1 * | 4/2005 | Bahrs et al. ................. | 715/526 |
| 6,898,636 B1 * | 5/2005 | Adams et al. .............. | 709/229 |
| 6,944,584 B1 * | 9/2005 | Tenney et al. ................ | 703/22 |
| 7,065,547 B2 * | 6/2006 | Persels et al. .............. | 709/200 |
| 2002/0138582 A1* | 9/2002 | Chandra et al. ............ | 709/206 |

\* cited by examiner

*Primary Examiner*—Nathan Flynn
*Assistant Examiner*—Jude J Jean-Gilles
(74) *Attorney, Agent, or Firm*—Dickstein Shapiro LLP (57) ABSTRACT

A data retrieval system and method includes a data server, a client terminal, and a web server. The client terminal performs a data retrieval operation. The web server handles data processed between the data server and the client terminal. The client terminal has a socket communications program for communicating with the web server without using the web browser of the web server. The web server communicates with the data server and sends data received from the data server back to the client terminal, in accordance with a request for data retrieval sent from the socket communications program of the client terminal.

13 Claims, 6 Drawing Sheets

FIG. 1
(PRIOR ART)

```
HTTP/1.1 200 OK
Server : Microsoft-11S/4.0
Date : Mon. 19 Feb 2001 09:16:58 GMT
Content-Type : text/html
Set-Cookie : ASPSESSIONIDQQQQGGFF=JOCFIBABFEBEGKECCFNENOPE : path=/
Cache-control : private <HTML>
<HEAD>
<META HTTP-EQUIV="Content-Type" CONTENT="text/html:charset=x-sjis">
<TITLE>Oracle TEST</TITLE>
</HEAD>
<BODY>
¥¥SUCCESS¥¥
5
11
<TABLE BORDER=1><TR><TD><B>TEST1</B></TD><TD><B>TEST2</B></TD>
<TD><B>TEST3</B></TD><TD><B>DTE</B></TD></TR>
<TR><TD>1</TD><TD>UPDATE1</TD><TD>TEST</TD><TD>01/02/19</TD></TR>
<TR><TD>2</TD><TD>UPDATE2</TD><TD>TEST</TD><TD>01/02/19</TD></TR>
<TR><TD>3</TD><TD>UPDATE3</TD><TD>TEST</TD><TD>01/02/19</TD></TR>
<TR><TD>4</TD><TD>UPDATE4</TD><TD>TEST</TD><TD>01/02/19</TD></TR>
<TR><TD>5</TD><TD>UPDATE5</TD><TD>TEST</TD><TD>01/02/19</TD></TR>
<TR><TD>6</TD><TD>UPDATE6</TD><TD>TEST</TD><TD>01/02/19</TD></TR>
<TR><TD>7</TD><TD>UPDATE7</TD><TD>TEST</TD><TD>01/02/19</TD></TR>
<TR><TD>8</TD><TD>UPDATE8</TD><TD>TEST</TD><TD>01/02/19</TD></TR>
<TR><TD>9</TD><TD>UPDATE9</TD><TD>TEST</TD><TD>01/02/19</TD></TR>
<TR><TD>10</TD><TD>UPDATE10</TD><TD>TEST</TD><TD>01/02/19</TD></TR>
<TR><TD>11</TD><TD>UPDATE11</TD><TD>TEST</TD><TD>01/02/19</TD></TR>
</TABLE>
</BODY>
</HTML>
```

```
HTTP/1.1 200 OK
Server : Microsoft-11S/4.0
Date : Mon. 19 Feb 2001 07:25:58 GMT
Content-Type : text/html
Set-Cookie : ASPSESSIONIDGGQQQQYF=EHIFLPMDJPCKPMLCGIOKPFAE : path=/
Cache-control : private ¥¥SUCCESS¥¥
4
-1
TEST1,TEST2,TEST3,DTE
1, UPDATE, TEST, 00/01/01
2, UPDATE, TEST, 00/01/02
3, UPDATE, TEST, 00/01/03
4, UPDATE, TEST, 00/01/04
5, UPDATE, TEST, 00/01/05
6, UPDATE, TEST,
7, UPDATE, TEST,
8, UPDATE, TEST,
9, UPDATE, TEST,
10, TEST, TEST,
11, TEST, TEST,
¥¥RECCOUNT 11
```

```
HTTP/1.1 200 OK
Server : Microsoft-11S/4.0
Date : Mon. 19 Feb 2001 07:14:24 GMT
Content-Type : text/html
Set-Cookie : ASPSESSIONIDGGQQQQYF=AHIFLPMDOJIEAKAMOODNBFNK : path=/
Cache-control : private ¥#ERROR¥#
ORACLE ERROR
ORA-00000: NO REAR OR VIEW EXIST
select * from ×××
```

40 (box)
50 (header section)
61
60
62

FIG. 6

METHOD AND APPARATUS FOR DATA RETRIEVAL FROM DATA SERVER USING A SOCKET COMMUNICATIONS PROGRAM

The present application claims the benefit of Japanese patent application, No. JPAP2001-306512 filed on Oct. 2, 2001 in the Japanese Patent Office, the entire contents of which are incorporated by reference herein.

FIELD OF THE INVENTION

The present invention relates to a method and apparatus for data retrieval, and more particularly to a method and apparatus for data retrieval from a data server via a web server using a socket communications program on a client terminal.

BACKGROUND OF THE INVENTION

Basically, there are two different data retrieval methods for a user to retrieve data from a data base of a data server. In one method, a user directly accesses the data server to retrieve data from a client terminal. In the other method, a web server is provided between the client server and the data server, and a user accesses the data server from the client terminal via the web server.

In the former case, all the client terminals using the data retrieval operation are necessarily provided with a special program for directly accessing the data server. Such special programs usually have a relatively large file size from tens to hundreds of megabytes, which takes a relatively long time to install on a client terminal. Additionally, such special programs may sometimes be inoperable due to incompatibility of an operating system of the client terminal or merely a difference in version of the operating system. Thus, the total system costs are relatively high. On the other hand, this system has the advantage that such special programs can normally operate in collaboration with other application programs.

In the latter case, a user usually uses a web browser to retrieve data from the data server. A special program for connecting to the data server is required to be installed on the web server. The client terminals do not need to have special programs and thus the cost of the total system is reduced. The client terminal, in this case, cannot use a web browser in collaboration with other application programs since the web browser operates on the web server. Therefore, the client terminal cannot process the data, received through the data retrieval operation, seamlessly with other application programs.

Figure 2:
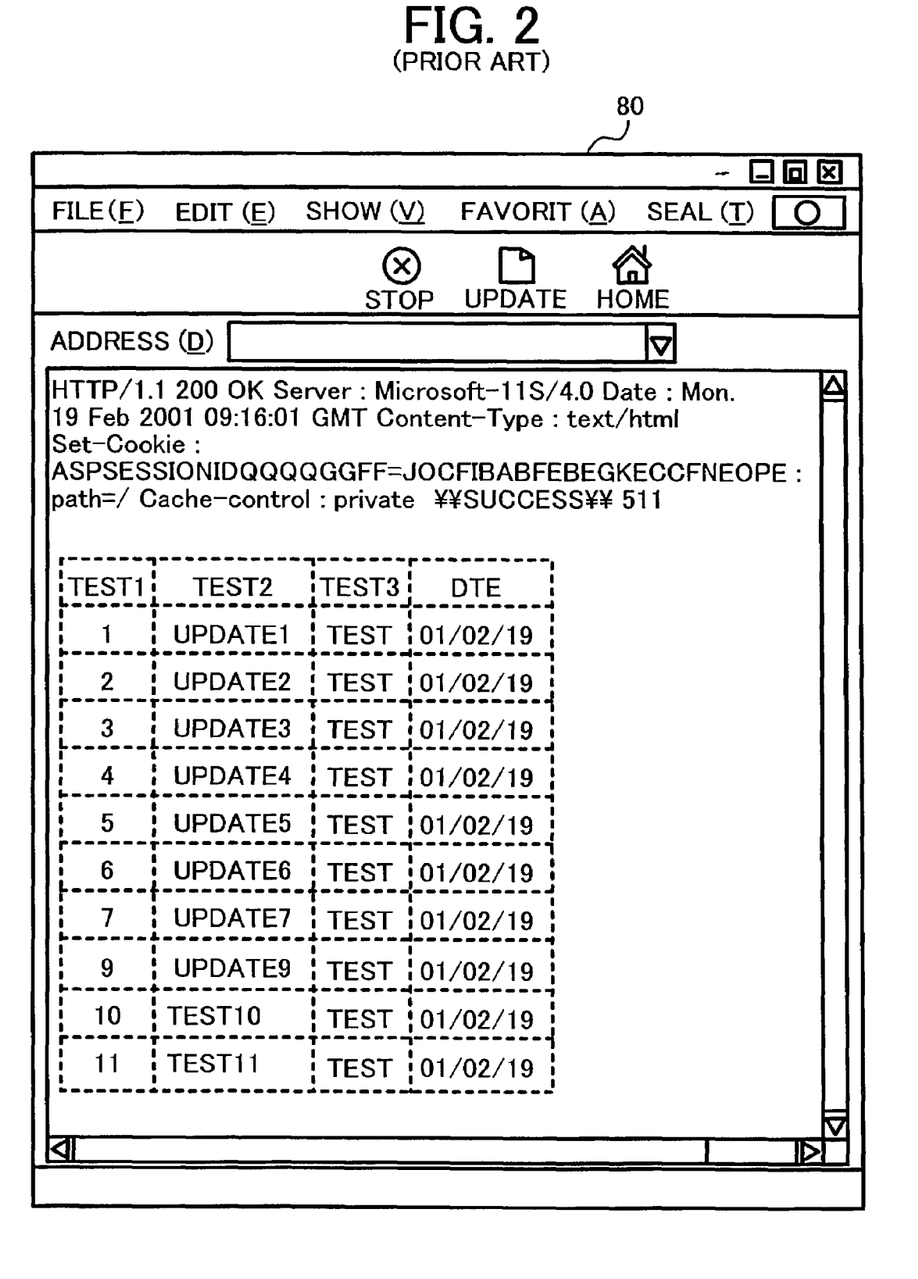
FIG. 2 is an exemplary prior art screen displayed using the screen source code set of FIG. 1.

Additionally, the web server, providing the services of the web browser, applies HTML and, accordingly, uses a relatively large number of table tags. This causes a receiver (e.g., the client terminal) difficulty in analyzing the data received from the web browser. Further, since a relatively large number of HTML tags are used in the data received from the web browser, there is an increase in communication costs between the web server and the client terminal with an increase of the number of columns and records. FIG. 1 shows an exemplary prior art screen source code set 70 for a response on the web browser to be transmitted to the client terminal by the web server when the web server is successful in the data retrieval operation. In order to display a response on the web browser, this code set 70 includes a number of HTML tags (e.g., tags of "'<TR>") in an entity body, which is the portion of the source code between "<BODY>'" and "</BODY>," as shown in FIG. 1. FIG. 2 is a prior art exemplary screen displayed using the screen source code set 70 of FIG. 1.

SUMMARY OF THE INVENTION

In view of the foregoing, it is an object of the present invention to provide a novel data retrieval system, which reduces the data communications and seamlessly handles retrieved data with an application program.

Another object of the present invention is to provide a novel method of data retrieval, which reduces a data communications and allows a user to seamlessly handle retrieved data with an application program.

To achieve the above-mentioned objects, in one example, a novel data retrieval system includes a data server, a client terminal, and a web server. The data server stores data. The client terminal performs a data retrieval operation. The web server has a web browser and handles data processed between the data server and the client terminal. In this system, the client terminal has a socket communications program for communicating with the web server without using the web browser. The web server communicates with the data server and sends data received from the data server back to the client terminal, in response to a request for data retrieval sent from the socket communications program of the client terminal.

The socket communications program may have functions of performing a URL-encode operation, generating a request for data retrieval in accordance with a hypertext transport protocol between the client terminal and the web server, transmitting the request to the web server, and receiving data as a result of data retrieval from the web server.

The data resulting from data retrieval from the web server may use commas as delimiters of data in an entity body.

The entity body may include flags indicating a success or a failure of the data retrieval, a number of columns and a number of records included in retrieved data, names of data column, and the retrieved data.

The socket communications program may be activated by a first application program and determines a connection parameter with the web server, a structured query language (SQL) query for data retrieval, and a second applications program reading a data retrieval result in accordance with values of arguments provided by the first application program.

Further, to achieve the above-mentioned objects, in another example, a novel method of data retrieval includes the following steps: providing a socket communications program to a client terminal to perform a data retrieval operation; applying a web browser to a web server to handle data processed between a data server and the client terminal; activating the socket communications program with a first application program on the client terminal to communicate with the web server without using the web browser; generating a request for data retrieval; sending the request for data retrieval from the socket communications program to the web server; forwarding the data retrieval request to the data server from the web server in accordance with the request sent from the socket communications program of the client terminal; and receiving data transmitted from the web server as a result of data retrieval with the socket communications program of the client terminal.

The generating step may generate the request for data retrieval in accordance with a hypertext transport protocol between the client terminal and the web server with the socket communications program performing a URL-encode operation.

The data resulting from date retrieval from the web server may use commas as delimiters of data in an entity body.

The entity body may include flags indicating a success or a failure of the data retrieval, a number of columns and a number of records included in retrieved data, names of data column, and the retrieved data.

The above-mentioned novel method may further include the following steps: determining arguments associated with at least a connection parameter with the web server, a structured query language (SQL) query for data retrieval, and a second applications program reading a data retrieval result requested by the first application program via the socket communications program; and passing a connection parameter with the web server, a structured query language (SQL) query for data retrieval, and a second applications program reading a data retrieval result in accordance with values -of the arguments provided by the first application program.

BRIEF DESCRIPTION OF THE DRAWINGS

A more complete, appreciation of the disclosure and many of the attendant advantages thereof will be readily obtained as the same becomes better understood by reference to the following detailed description when considered in connection with the accompanying drawings, wherein:

FIG. 1 is an exemplary prior art screen source code set including HTML tags for a web browser response on a web server generated by a background data retrieval system;

DETAILED DESCRIPTION OF PREFERRED EMBODIMENTS

Figure 3:
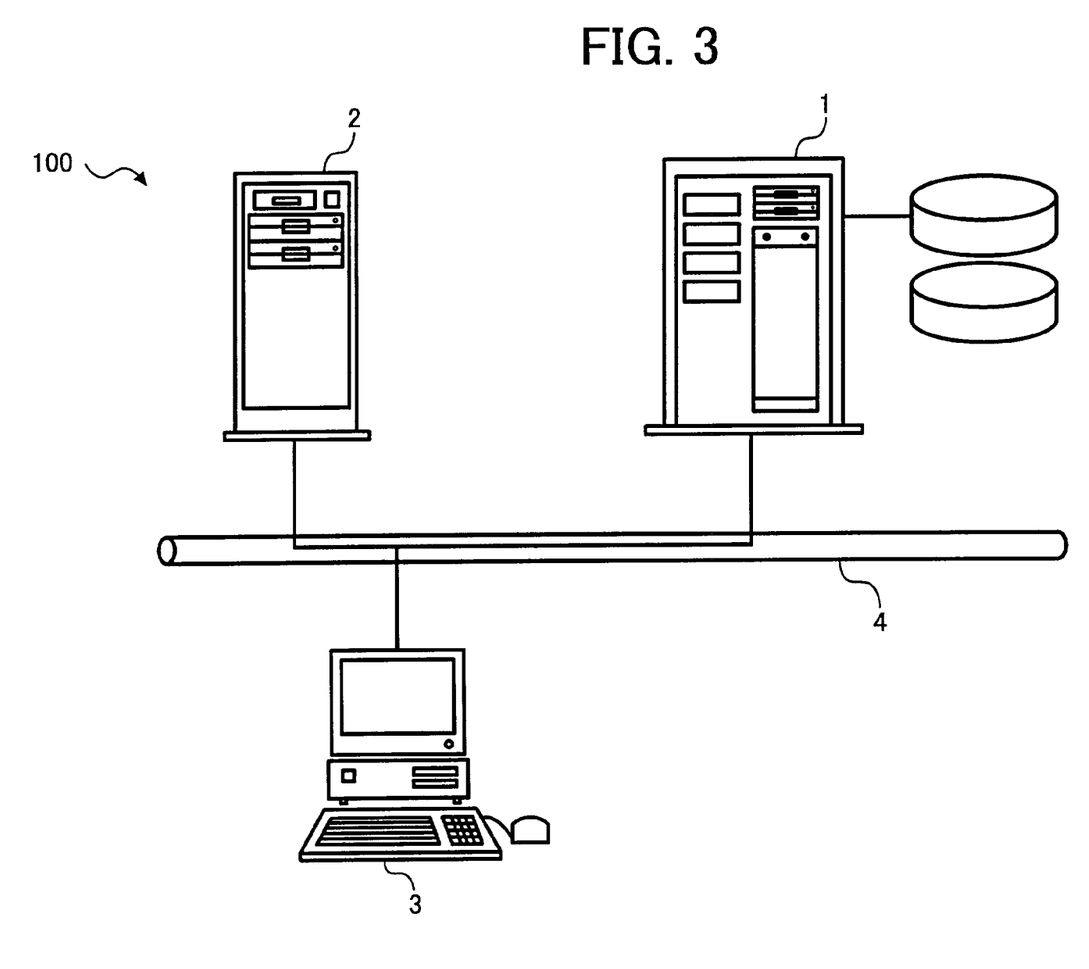
FIG. 3 is a schematic illustration for explaining a data retrieval system according to a preferred embodiment of the present invention.

In describing the preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a data retrieval system 100, according to a preferred embodiment of the present invention, is explained. As shown in FIG. 3, the data retrieval system 100 includes a data server 1, a web server 2, and a client terminal 3. The data server 1, the web server 2, and the client terminal 3 are connected each other through the Internet 4. In the data retrieval system 100, the data server 1 and the web server 2 may implemented in a single apparatus.

The client terminal 3 is provided with a socket communication program for executing socket communications with the web server 2. The web server 2 is provided with a program for executing communications with the data server 1, retrieving data therefrom, and sending the retrieved data to the client terminal 3, in accordance with a request sent from the client terminal 3.

The socket communications program installed in the client terminal 3 is activated by a first application program which passes arguments to the socket communications program when activating the socket communications program of the client terminal 3. The arguments represent a web server address and parameters for connection, and the parameters include a timeout period for a program to be activated on the web, a uniform source locator (URL) address, data server information, an structured query language (SQL) query (i.e., a key word for data retrieval), and a method of receiving resultant data, for example, by a memory transfer or by a file transfer.

The socket communications program connects to the web server 2 after reading values of arguments provided by the first application program. The socket communications program then performs a URL-encode operation for encoding a URL address, information for a data server, an SQL query, and any other necessary information into a URL-encode form, and sends the URL-encoded data as a request for data retrieval in accordance with an HTTP (hypertext transport protocol) defining a protocol used between the client terminal to the web server 2.

The program on the web server 2 connects to the data server 1 after reading the URL-encoded data sent from the socket communications program of the client terminal 3, and then extracts information based on the SQL query. The program on the web server 2 calculates a number of columns and a number of records with respect to the extracted data and then generates an HTML (hypertext markup language) text with the extracted data and the calculated column and record numbers. Information indicative of whether the data communications operation (i.e., a data retrieval operation) with the data server 1 has succeeded or failed is also embedded in the HTML text. The program on the web server 2 then sends the HTML text to the client terminal 3. At this time, the program on the web server 2 uses a comma "," as a data delimiter instead of using an HTML tag. The socket communications program of the client terminal 3 determines whether the data retrieval operation has succeeded or failed based on the received result. When the socket communications program determines that the data retrieval operation is successful, it automatically executes a predetermined operation for processing the result.

Figure 4:
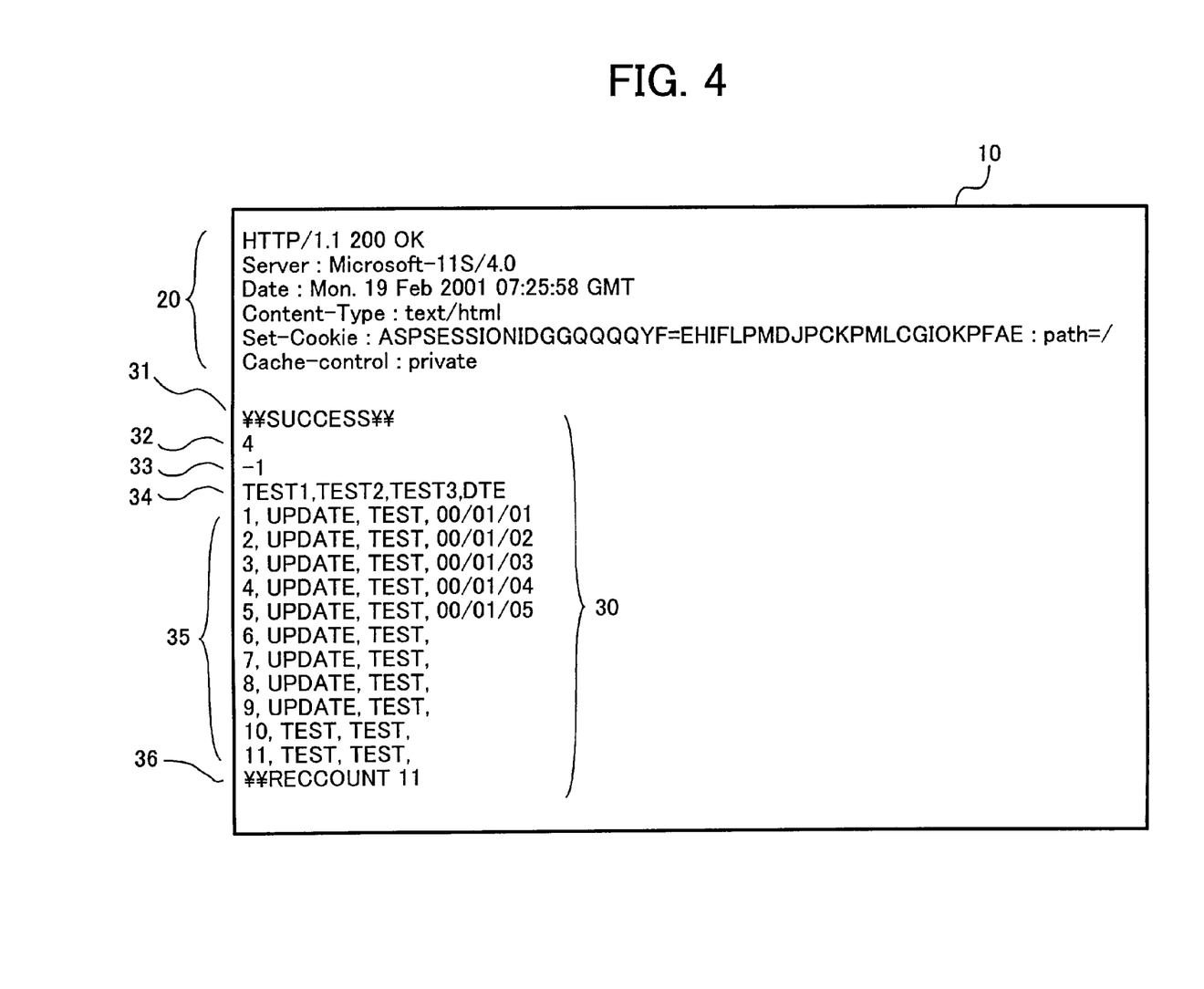
FIG. 4 is an exemplary screen source code set for a response by a web server of the data retrieval system of the present invention when a data retrieval operation is successful.
Figure 5:
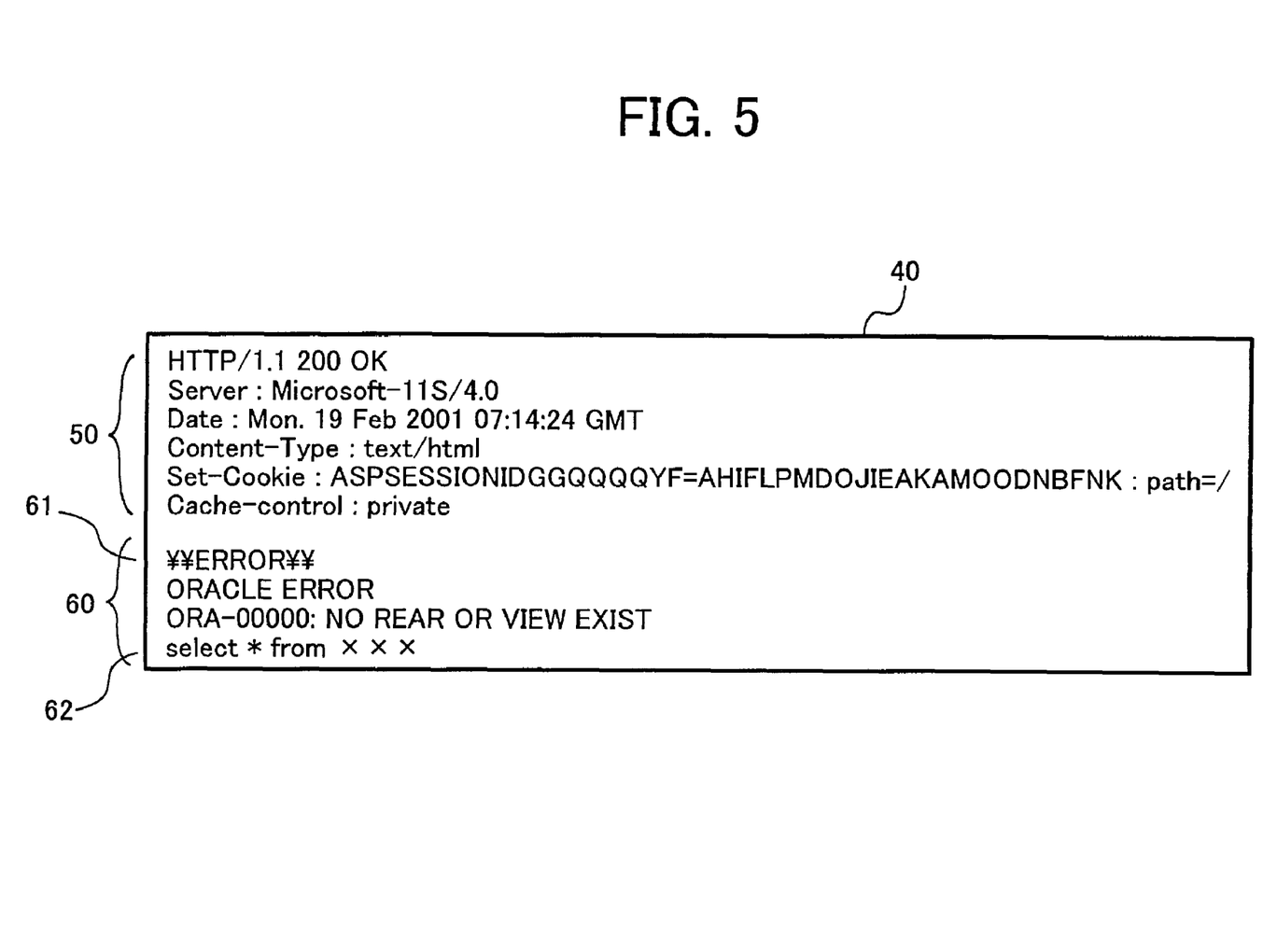
FIG. 5 is an exemplary screen source code set for a response by the web server of the data retrieval system of the present invention when the data retrieval operation has failed.

FIG. 4 shows an exemplary response 10 transmitted from the web server 2 to the client terminal 3 when the program of the web server 2 is successful in the data retrieval operation. FIG. 5 shows an exemplary response 40 transmitted when the web server 2 data retrieval operation fails.

As shown in FIG. 4, the response 10 includes an entity header 20 and an entity body 30. The entity body 30 includes a result 31, a column number 32, a flag 33, a column name portion 34, a data portion 35, and a record count 3b. The result 31 indicates a result of the data retrieval operation. The column number 32 indicates a number of data columns. The flag 33 indicates a status in which the number of data record is indicated in the last line. The column name portion 34 indicates names of data columns, The data portion 35 indicates data as a result of data retrieval. The record number 36 indicates the number of data records. Likewise, in FIG. 5, the response 40 includes an entity header 50 and an entity body 60. The entity body 60 includes a result 61 and a keyword 62. The result 61 indicates the result of the data retrieval operation. The keyword 62 indicates the SQL query transmitted to the data server 1.

In each of the responses 10 and 40, an HTML tag is not included in an entity body. By comparing these responses 10 and 40 with the response 70 of FIG. 1 made by the conventional data retrieval system, it is clearly understood that the responses 10 and 40 can reduce an amount of data.

When the response includes HTML tags, a data amount X1 (in bytes) required for the response is calculated with the equation;

$$X1=(A*B*C)+(B*C)+(B*D)+2+E+F,$$

Wherein A represents a column number, B represents a record number, C represents a number of bytes for table tags, D represents a number of bytes for return codes, E represents a number of bytes for entity headers, and F represents a number of bytes for other HTML tags.

In contrast, when the response includes commas instead of HTML tags, a data amount X2 (in bytes) required for the response is calculated with the equation $$X2=(A*B*G)+(B*D)+2+E+F,$$

wherein representations of A, B, D, E, and F are same as those mentioned above and G represents a number of bytes for commas.

Figure 6:
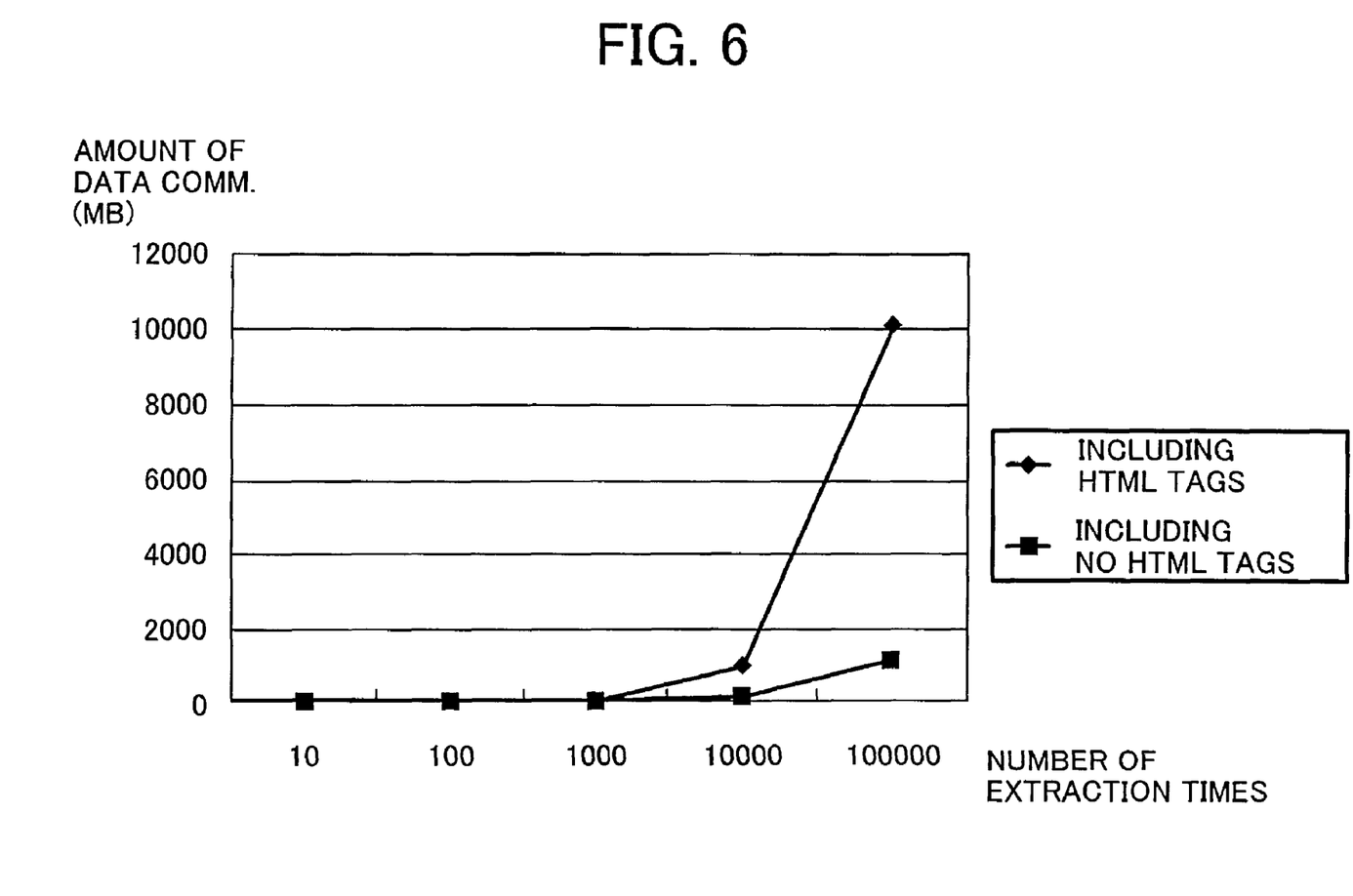
FIG. 6 is a graph of the relationship between data communications and the number of extracted records in both successful and failed data retrieval operations.

FIG. 6 is a graph indicating data communications amounts relative to a number of record extraction times in two cases, using HTML tags as a delimiter and using commas as a delimiter instead of HTML tags. From FIG. 6, it is understood that the communications data amount without using the HTML tags is about one tenth of that using the HTML tags when the number of data extraction times is approximately 100,000. As a consequence, both the web server 2 and client terminal 3 can reduce data analysis time, particularly the tags, and achieve relatively high speed data communications and processing operations.

In addition, it is possible to embed information into the entity body in the response data from the web server 2, indicating, for example, whether web server 2 is successful in accessing to the data server 1 and properly performs the data retrieval operation in accordance with the program. Upon receiving such information, the program of the client terminal 3 can determine whether the data received from the web server 2 is appropriate. Likewise, information indicative of the number of columns and the number of records can also be embedded into the entity body in the response data from the web server 2 so that the program of the client terminal 3 can calculate the amount of data and efficiently process the data received.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art. The invention may also be realized using RISC or FPGA technology Numerous additional modifications and variations are possible in light of the above teachings. It is, therefore, to be understood that within the scope of the appended claims, the disclosure of this patent specification may be practiced otherwise than as specifically described herein.

What is claimed is:

1. A data retrieval system, comprising:
    a data server configured to store data;
    a client terminal configured to perform a data retrieval operation; and
    a web server having a web browser, said web server configured to handle data communicated between the data server and the client terminal,
    wherein the client terminal has a socket communications program for communicating with the web server without using the web browser,
    wherein in response to a request for data retrieval sent from the socket communications program of the client terminal, the web server communicates with the data server and returns data received from the data server to the client terminal, and
    wherein the socket communications program:
        is activated by a first applications program;
        determines:
            a connection parameter with the web server; and
            a structured query language (SQL) query for data retrieval; and
        initiates a second applications program reading a data retrieval result in accordance with values of arguments provided by said first applications program.

2. The data retrieval system according to claim 1, wherein the socket communications program performs a URL-encode operation, generates a request for data retrieval in accordance with a hypertext transport protocol between the client terminal and the web server, transmits the data retrieval request to the web server, and receives data as a result of data retrieval from the web server.

3. The data retrieval system according claim 2, wherein the data resulting from data retrieval from the web server uses commas as a delimiter of data in an entity body.

4. The data retrieval system according to claim 3, wherein the entity body includes flags indicating one of a success and a failure of the data retrieval, a number of columns and a number of records included in retrieved data, names of data column, and the retrieved data.

5. A data retrieval system, comprising:
    a data server storing data;
    a client terminal performing a data retrieval operation; and
    a web server having a web browser, said web server handling data processed between the data server and the client terminal,
    wherein the client terminal has a socket communications program communicating with the web server without using the web browser,
    wherein in response to a request for data retrieval sent from the socket communications program of the client terminal, the web server communicates with the data server and returns data received from the data server to the client terminal, and
    wherein the socket communications program:
        is activated by a first applications program;
        determines:

a connection parameter with the web server; and
a structured query language (SQL) query for data retrieval; and
initiates a second applications program reading a data retrieval result in accordance with values of arguments provided by the first applications program.

6. The data retrieval system according to claim 5, wherein the socket communications program performs a URL-encode operation, generates a request for data retrieval in accordance with a hypertext transport protocol between the client terminal and the web server, transmits the data retrieval request to the web server, and receives data as a result of data retrieval operation from the web server.

7. The data retrieval system according to claim 6, wherein the data resulting from data retrieval from the web server uses commas as a delimiter of data in an entity body.

8. The data retrieval system according to claim 7, wherein the entity body includes flags indicating one of a success and a failure of the data retrieval operation, a number of columns and a number of records included in retrieved data, names of data column, and the retrieved data.

9. A method of data retrieving, comprising the steps of:
providing a socket communications program to a client terminal to perform a data retrieval operation;
applying a web browser to a web server, said web server handling data processed between a data server and the client terminal;
activating the socket communications program with a first applications program on the client terminal to communicate with the web server without using the web browser, generating a request for data retrieval;
sending the request for data retrieval from the socket communications program to the web server;
performing data retrieval from the data server via the web server in accordance with the request sent from the socket communications program of the client terminal; and
receiving data transmitted from the web server as a result of data retrieval operation with the socket communications program of the client terminal; and
determining arguments associated with at least:
a connection parameter to the web server,
a structured query language (SQL) query for data retrieval, and
initiating a second applications program reading a data retrieval resulting from the first applications program interface with the socket communications program.

10. The method according to claim 9, wherein the generating step generates the request for data retrieval in accordance with a hypertext transport protocol between the client terminal and the web server with the socket communications program performing a URL-encode operation.

11. The method according to claim 10, wherein the data resulting from data retrieval from the web server uses commas at a delimiter of data in an entity body.

12. The method according to claim 11, wherein the entity body includes flags indicating a success or a failure of the data retrieval, a number of columns and a number of records included in retrieved data, names of data column, and the retrieved data.

13. The method according to claim 9, further comprising the step of:
passing the connection parameter with the web server, the structured query language (SQL) query for data retrieval, and a second applications program, reading the data retrieval result in accordance with values of the arguments provided by the first application program.

* * * * *